(12) United States Patent
Cohen

(10) Patent No.: US 8,046,892 B2
(45) Date of Patent: Nov. 1, 2011

(54) METHOD OF INHIBITING ACCESS

(75) Inventor: Jason Cohen, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1695 days.

(21) Appl. No.: 11/114,284

(22) Filed: Apr. 26, 2005

(65) Prior Publication Data
US 2006/0236998 A1 Oct. 26, 2006

(51) Int. Cl.
B21D 39/03 (2006.01)
A01K 3/00 (2006.01)
(52) U.S. Cl. ............................................. 29/428; 256/10
(58) Field of Classification Search .................... 29/428; 340/573.4; 256/10
See application file for complete search history.

(56) References Cited

U.S. PATENT DOCUMENTS

| | | | |
|---|---|---|---|
| 3,141,602 A | 7/1964 | Anderson | |
| 3,370,630 A | 2/1968 | Haugh | |
| 3,653,585 A | 4/1972 | Kazaros | |
| 4,381,058 A | 4/1983 | Chaussadas et al. | |
| 4,696,050 A | 9/1987 | Sengewald | |
| 4,878,764 A | 11/1989 | Meyer | |
| 4,966,286 A | 10/1990 | Muckenfuhs | |
| 5,036,978 A | 8/1991 | Frank et al. | |
| 5,048,687 A | 9/1991 | Suzuki et al. | |
| 5,067,612 A | 11/1991 | Tsuchiya et al. | |
| 5,163,558 A | 11/1992 | Palumbo et al. | |
| 5,232,118 A | 8/1993 | Samuel | |
| 5,282,687 A | 2/1994 | Yee | |
| 5,361,905 A | 11/1994 | McQueeny et al. | |
| 5,467,894 A | 11/1995 | Altonen et al. | |
| 5,722,774 A | 3/1998 | Hartz | |
| 5,801,617 A * | 9/1998 | Langner et al. | ......... 340/426.31 |
| 5,967,665 A | 10/1999 | MacDonald et al. | |
| 6,213,645 B1 | 4/2001 | Beer | |
| 6,318,555 B1 | 11/2001 | Kuske | |
| 6,397,560 B1 | 6/2002 | Weder | |

(Continued)

FOREIGN PATENT DOCUMENTS

EP 0521833 A1 1/1993

(Continued)

OTHER PUBLICATIONS

Didier Bouhassira, Delphine Kern, Jean Rouland, Emilie Pelle-Lancien, Francoise Morain. "Investigation of the paradoxical painful sensation ('illusion of pain') produced by a thermal grill." Journal of Pain Dec. 14, 2004, pp. 160-167.*

(Continued)

Primary Examiner — David Bryant
Assistant Examiner — Jacob Cigna
(74) Attorney, Agent, or Firm — Armstrong Teasdale LLP

(57) ABSTRACT

The present invention relate to a method of inhibiting access. Some embodiments of the method include determining that access to an item needs to be inhibited and positioning a thermal grill relative to the item such that the thermal grill provides a barrier against an individual engaging the item. A thermal grill is a device that has several relatively warm portions which are interlaced with several relatively cold portions. When an individual contacts the thermal grill, the temperature difference between the warm and cold portions causes an individual to feel pain (or discomfort) without physiologically damaging the individual. Therefore, the method inhibits access by notifying individuals that they are performing an undesirable activity when they touch the thermal grill without permanently injuring the individual.

25 Claims, 3 Drawing Sheets

U.S. PATENT DOCUMENTS

| | | |
|---|---|---|
| 6,491,165 B2 | 12/2002 | Kuske |
| 6,561,696 B1 | 5/2003 | Rusnak et al. |
| 6,601,705 B2 | 8/2003 | Molina |
| 6,626,570 B2 | 9/2003 | Fox et al. |
| 6,681,934 B2 | 1/2004 | Kolterjohn et al. |
| 6,708,823 B2 | 3/2004 | Cottingham et al. |

FOREIGN PATENT DOCUMENTS

| | | |
|---|---|---|
| EP | 1156099 A2 | 11/2001 |

OTHER PUBLICATIONS

Definition of "Activate" World English Dictionary Mar. 21, 2011 <http://dictionary.reference.com/browse/activate> p. 2.*

Bouhassira, D., et al., "Investigation of the paradoxical Painful Sensation('Illusion of Pain') Produced by a Thermal Grill", *Pain*, 114(1-2), Elsevier Science Publishers,(Mar. 2005), 160-167.

Heavner, J. E., et al., "Thermal Grill Illusion and Complex Regional Pain Syndrome Type I(Reflex Sympathetic Dystrophy)", *Medline*, 22(3), (Jun. 1997),257-259.

"International Search Report for corresponding PCT Application No. PCT/US2006/002249", (May 12, 2006), 3 pgs.

Bernard, Thomas E., "Upper Acceptable Surface Temperature for Prolonged Hand Contact," International Journal of Industrial Ergonomics, 11 (1993) 29-36, 8 pages.

Communication pursuant to Article 94(3) EPC for Application No. 06719200.5 dated Mar. 9, 2011.

* cited by examiner

METHOD OF INHIBITING ACCESS

FIELD

Some embodiments of the invention relate to a method of inhibiting access, and in particular to a method that utilizes a thermal grill to inhibit access.

BACKGROUND

People have historically gone to great lengths in order to prevent individuals from entering certain areas (e.g., rooms, cabinets, buildings). In addition, there has also been a desire to prevent various items from being relocated without permission (i.e. theft or misplacement).

One way to inhibit access to an area and/or device is to place a locking mechanism (e.g., a padlock) in an appropriate location such that the locking mechanism provides a barrier. Several drawbacks are associated with using locking mechanisms. One of the drawbacks is that locking mechanisms are typically cumbersome to apply and difficult to position. Another drawback is that locking mechanisms often invite tampering by individuals that are seeking to bypass the locking mechanism.

Another way to inhibit access to an area is by using electrical devices. A typical electrical device (e.g., an electrical fence or screen) is often located in an area such that the electrical device serves as a barrier. One concern with using electrical devices to serve as barriers is that they can cause severe injury to individuals that touch an electrical device.

A warning sign that advises individuals not to touch the electrical device typically accompanies most electrical devices. However, individuals may still be harmed if they decide to ignore the warning, or they accidentally engage the electrical device.

There is a need for a method of inhibiting access that uses a device which provides a barrier yet does not cause physical harm to individuals that engage the barrier. The method should also be able to notify individuals that they are performing an undesirable activity as they engage the barrier.

SUMMARY OF THE INVENTION

A thermal grill is a device that has several relatively warm portions which are interlaced with several relatively cold portions. When an individual contacts the thermal grill, the temperature difference between the warm and cold portions causes an individual to feel pain without physiologically damaging the individual.

The present invention relates to a method that uses a thermal grill to provide a barrier. The temperature difference between the interlaced warm and cold portions of the thermal grill allows the thermal grill to deliver pain without causing physiological damage when an individual touches the thermal grill.

In one aspect, the method includes determining that access to an item needs to be inhibited. The method further includes positioning a thermal grill relative to the item such that the thermal grill provides a barrier against an individual engaging the item.

In some forms of the method, positioning a thermal grill relative to the item may include positioning the thermal grill adjacent to the item, and/or attaching the thermal grill to the item. Positioning the thermal grill relative to the item may also include covering the item with the thermal grill.

The method uses a thermal grill to inhibit access. Therefore, the method provides a barrier which does not cause physical injury to individuals that engage the barrier.

In another aspect, the method includes determining that access to an item needs to be inhibited. The method further includes integrating a thermal grill with the item such that the thermal grill provides a barrier against an individual touching the item.

In some embodiments, integrating the thermal grill with the item may include attaching the thermal grill to the item. In other embodiments, integrating the thermal grill with the item may include fabricating the item (e.g., a door) such that the thermal grill is part of the item.

The method inhibits access by causing pain (or discomfort) to an individual without causing physiological damage when the individual touches the thermal grill. Therefore, the method notifies individuals that they are performing an undesirable activity when they touch the thermal grill without permanently injuring the individual.

In still another aspect, the method includes obtaining a thermal grill and placing the thermal grill in a location that inhibits an individual from engaging an item. In some embodiments, placing the thermal grill in a location that inhibits an individual from engaging an item may include positioning the thermal grill adjacent to the item. It should be noted that the thermal grill may be oriented such that the individual may be able to access the item from one or more directions relative to the item, and/or touch the item at more locations on the item.

In some forms of the method, obtaining a thermal grill may include obtaining an item (e.g., a handle) that has a thermal grill integrated into the item. The type of item will depend in part on the application where the method is used.

The purposes and features of the present invention will be set forth in the description that follows. Additional features of the invention may be realized and attained by the product and processes particularly pointed out in the written description and claims hereof, as well as from the appended drawings.

It is to be understood that both the foregoing general description and the following detailed description are exemplary and are intended to provide further explanation of the invention claimed. The accompanying drawings, which are incorporated in and constitute part of this specification, are included to illustrate and provide a further understanding of the invention.

BRIEF DESCRIPTION OF THE DRAWINGS

The present invention will be more fully understood, and further features will become apparent, when reference is made to the following detailed description and the accompanying drawings. The drawings are merely representative and are not intended to limit the scope of the claims. Like parts depicted in the drawings are referred to by the same reference numerals.

DEFINITION

As used herein, a "thermal grill" is a device that includes interlaced warm and cold portions where the temperature difference between the interlaced warm and cold portions causes an individual to feel pain (or discomfort) when the individual touches the thermal grill but does not cause physiological damage to the individual. It should be noted that not causing physiological damage means that the stimuli which is provided by the thermal grill can not cause injury to an individual that touches the thermal grill with their skin.

The interlaced warm and cold portions may be a variety of sizes, designs, configurations, shapes, temperatures and orientations as long as the thermal grill generates pain within an individual without physiologically damaging the individual when the individual touches the thermal grill. The relative size and shape of the interlaced warm and cold portions that form the thermal grill will depend on the applications where the thermal grill is used.

DETAILED DESCRIPTION OF THE INVENTION

The following detailed description references the accompanying drawings which show some example embodiments of the invention. These example embodiments are described in sufficient detail to enable those skilled in the art to practice the invention. It is to be understood that other embodiments may be utilized, or structural changes made, such that the detailed description should not be considered as limiting the scope of the claims.

Figure 1:
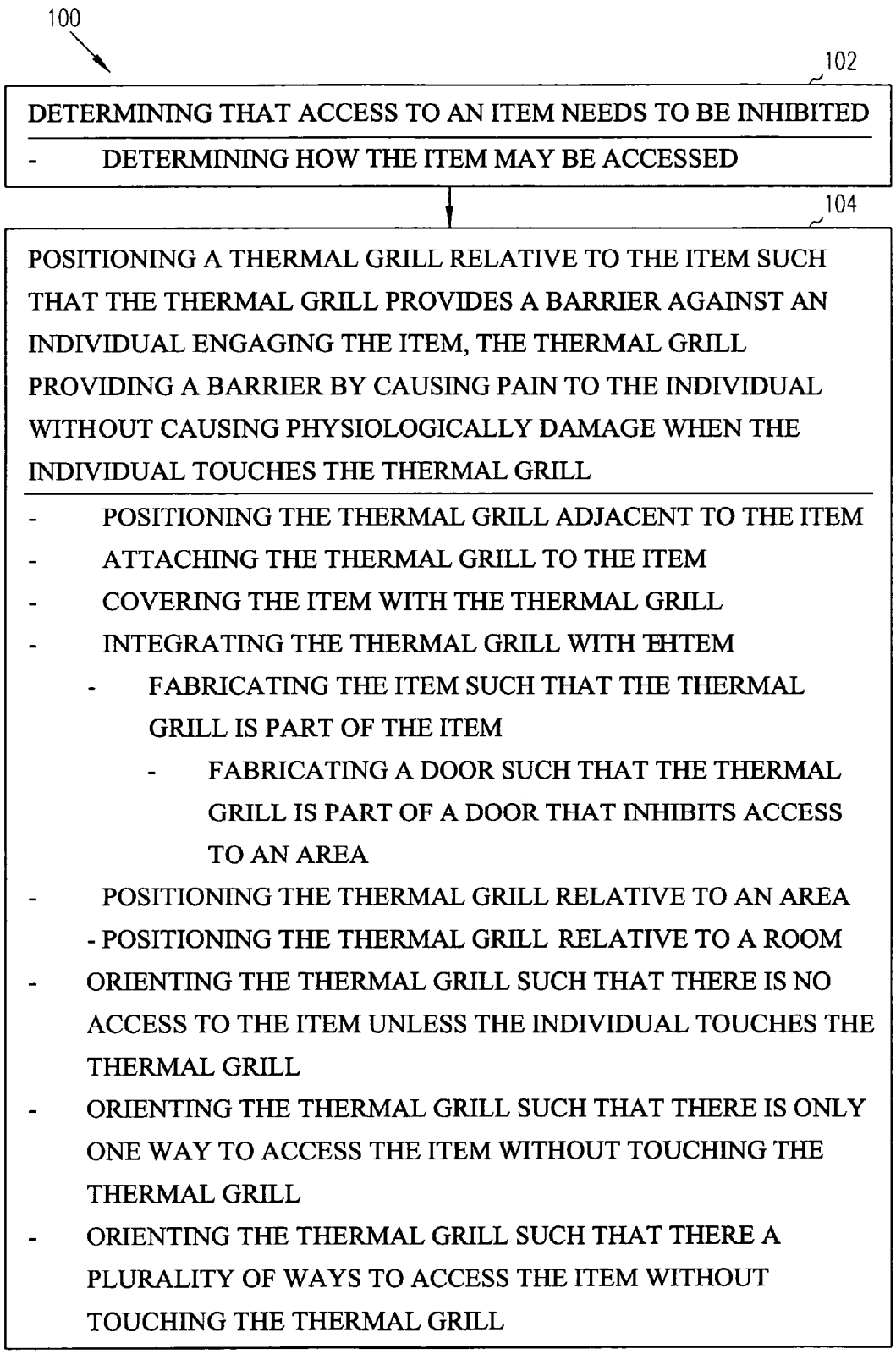
FIG. 1 is a flow diagram illustrating a method of inhibiting access according to one example embodiment of the present invention.

FIG. 1 is a flow diagram illustrating a method 100 of inhibiting access according to one example embodiment of the present invention. The method 100 includes determining that access to an item needs to be inhibited 102 and positioning a thermal grill relative to the item such that the thermal grill provides a barrier to an individual seeking to touch the item 104. A thermal grill is a device that has several relatively warm portions which are interlaced with several relatively cold portions. When an individual contacts the thermal grill, the temperature difference between the warm and cold portions causes an individual to feel pain without physiologically damaging the individual.

As used herein, "pain" means pain, discomfort and/or unpleasant feeling. It should be noted that the thermal grill may be any type of thermal grill that is known now or discovered in the future.

In some embodiments, positioning a thermal grill relative to the item 104 may include (i) positioning the thermal grill adjacent to the item; (ii) attaching the thermal grill to the item; and/or (iii) covering the item with the thermal grill. The orientation of thermal grill relative to the item will depend in part on the size and shape of item as well as the application where the system 100 is used.

In addition, positioning a thermal grill relative to the item 104 may include integrating the thermal grill with the item. It should be noted that integrating the thermal grill with the item may include fabricating the item such that the thermal grill is part of the item. As an example, the thermal grill may be fabricated as part of a door (or some other item) that can be used to provide a barrier.

In some embodiments, positioning a thermal grill relative to the item 104 may include positioning the thermal grill relative to an area (e.g., a room). When the thermal grill is positioned relative to an area, the thermal grill may serve to inhibit access to the area.

In some forms of the method, determining that access to an item needs to be inhibited 102 may include determining how the item may be accessed. As an example, it may be determined that the item may not be accessed from any orientation, or accessed from one or some orientations. In addition, it may be determined that the item may not be touched, or touched at one or more locations. It should be noted that the thermal grill may always be activated such that the item may never be engaged, or the thermal grill may be activated some of the time such that the item may be engaged at only certain times.

In some embodiments, positioning a thermal grill relative to the item 104 may include (i) orienting the thermal grill such that there is no access to the item unless the individual touches the thermal grill; (ii) orienting the thermal grill such that there is only one way to access the item without touching the thermal grill; or (iii) orienting the thermal grill such that there a plurality of ways to access the item without touching the thermal grill.

Figure 2:
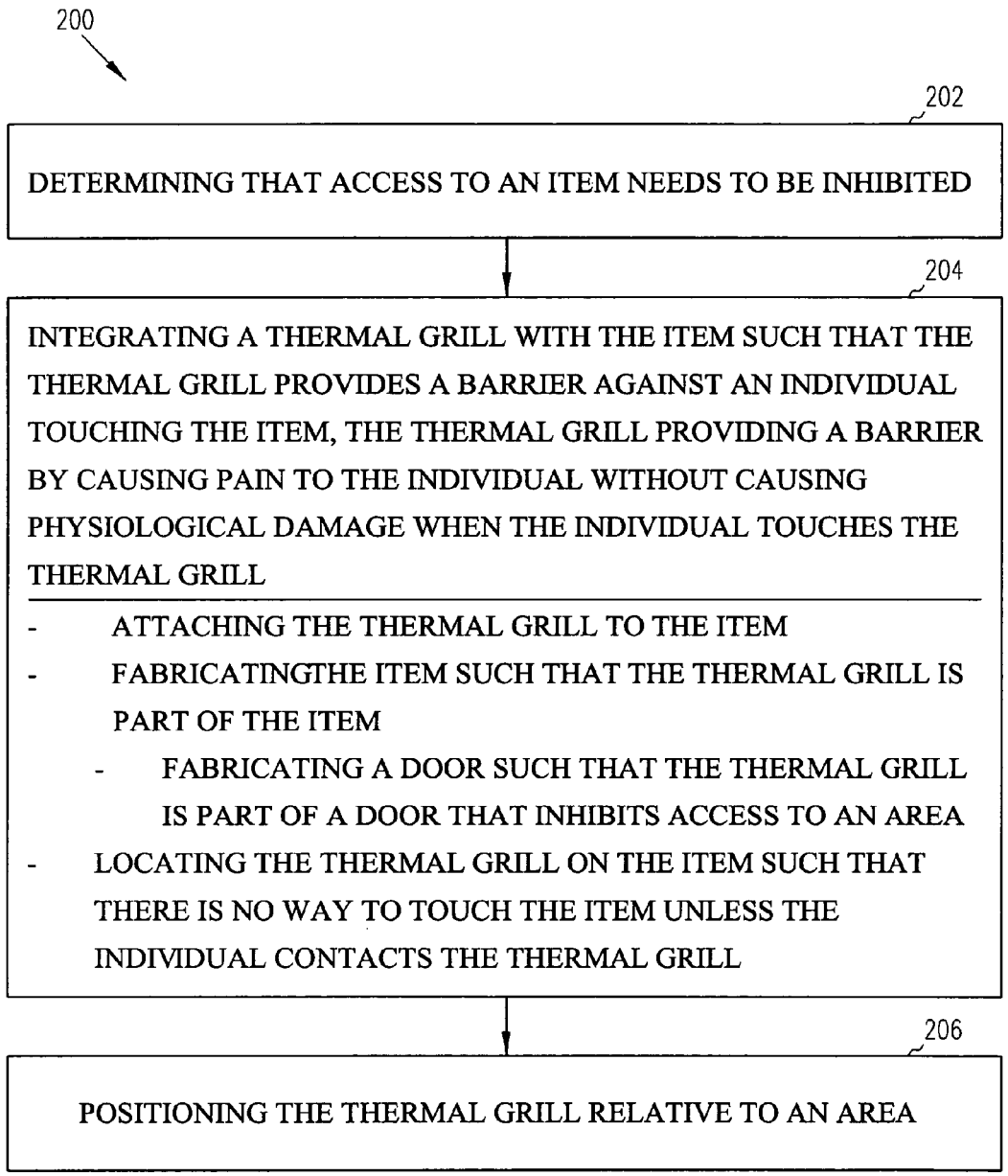
FIG. 2 is a flow diagram illustrating a method of inhibiting access according to another example embodiment of the present invention.

FIG. 2 is a flow diagram illustrating a method 200 of inhibiting access according to another example embodiment of the present invention. The method 200 includes determining that access to an item needs to be inhibited 202 and integrating a thermal grill with the item such that the thermal grill provides a barrier to an individual seeking to touch the item 204.

The thermal grill provides a barrier by causing pain (or discomfort) to the individual without causing physiological damage to the individual when the individual touches the thermal grill. Therefore, the method notifies individuals that they are performing an undesirable activity when they engage the thermal grill without permanently injuring the individual.

The thermal grill may be any type of thermal grill that is known now or discovered in the future. The type of thermal grill will depend in part on the application where the method 200 is used.

It should be noted that integrating the thermal grill with the item 204 may include locating the thermal grill on the item such that there is no way to touch the item unless the individual contacts the thermal grill. In addition, the thermal may be located on the item such that the item may be touched at one or more locations without contacting the thermal grill.

In some embodiments, integrating the thermal grill with the item 204 may include attaching the thermal grill to the item while in other embodiments integrating the thermal grill with the item 204 may include fabricating the item such that the thermal grill is part of the item. As an example, fabricating the item such that the thermal grill is part of the item may include fabricating a door (or some other barrier) such that the thermal grill is part of a door that inhibits access to an area.

The method may further include positioning the thermal grill relative to an area 206. As an example, the thermal grill may be positioned relative to a room such that thermal grill provides a barrier to the room.

Figure 3:
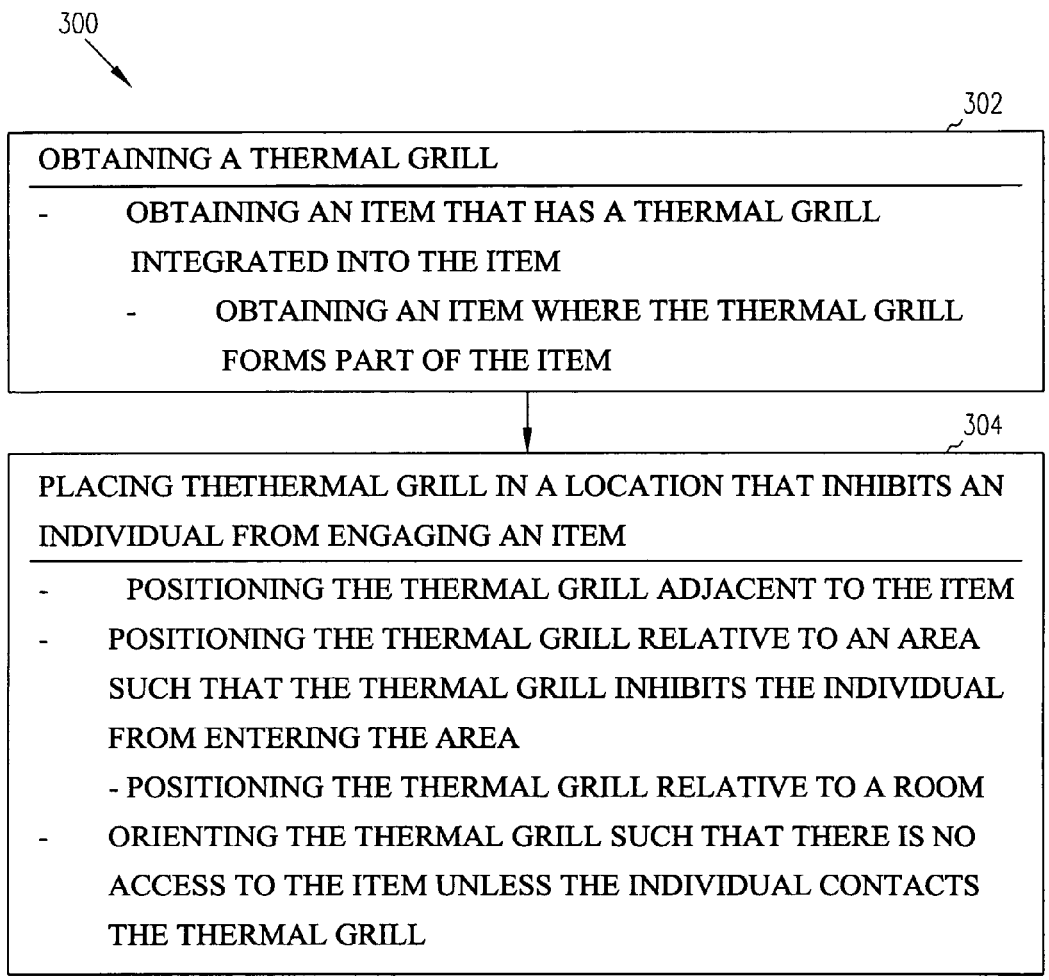
FIG. 3 is a flow diagram illustrating a method of inhibiting access according to another example embodiment of the present invention.

FIG. 3 is a flow diagram illustrating a method 300 of inhibiting access according to another example embodiment of the present invention. The method includes obtaining a thermal grill 302 and placing the thermal grill in a location that inhibits an individual from engaging an item 304. The thermal grill may be similar to any of the thermal grills described above. The type of thermal grill will depend in part on the application where the method 300 is used.

In some embodiments, placing the thermal grill in a location that inhibits an individual from engaging an item 304 may include positioning the thermal grill adjacent to the item. It should be noted that in other embodiments the thermal grill may cover the item and/or be attached to the item In some forms of the method, obtaining a thermal grill 302 may include obtaining an item that has a thermal grill integrated into the item. As an example, obtaining an item that has a thermal grill integrated into the item may include obtaining an item where the thermal grill forms part of the item. Some example items that could have a thermal grill integrated into them include doors and handles (among numerous other items). The type of item will depend in part on the application where the method 300 is used.

In some embodiments, placing the thermal grill in a location that inhibits an individual from engaging an item 304 may include (i) positioning the thermal grill relative to an area (e.g., a room) such that the thermal grill inhibits the individual from entering the area; and/or (ii) orienting the thermal grill such that there is no access to the item unless the individual touches the thermal grill. It should be noted that the thermal grill may be oriented such that the individual may be able to access the item from one or more directions relative to the item, and/or touch the item at more locations on the item.

The operations discussed above with respect to the described methods may be performed in a different order from those described herein. It should be noted that type of thermal grill that is used in the method may vary as long as the thermal grill delivers pain (or discomfort) to an individual without physiologically damaging the individual.

The methods described herein inhibit access by using a thermal grill to provide a barrier. The methods provide a barrier without causing physical harm to individuals that touch the barrier. The pain (or discomfort) that is caused by the methods also serves to notify individuals that they are performing an undesirable activity when they touch the thermal grill.

While the invention has been described in detail with respect to the specific aspects thereof, it will be appreciated that those skilled in the art, upon attaining an understanding of the foregoing, may readily conceive of alterations to, variations of, and equivalents to these aspects which fall within the spirit and scope of the present invention, which should be assessed accordingly to that of the appended claims.

I claim:

1. A method of inhibiting access, the method comprising:
   determining that access to an item needs to be inhibited;
   positioning a thermal grill relative to the item such that the thermal grill provides a barrier against an individual engaging the item, the thermal grill having warm portions and cold portions interlaced with the warm portions, the thermal grill providing a barrier when activated by heating the warm portions and cooling the cold portions to create a temperature differential, the temperature differential between the heated warm portions and the cooled cold portions causing pain to the individual without causing physiological damage when the individual touches the thermal grill; and
   activating the thermal grill when the thermal grill is positioned relative to the item, the thermal grill being activated for an entire duration of time during which access to the item is to be inhibited such that the warm portions are always heated and the cold portions are always cooled during activation of the thermal grill.

2. The method of claim 1 wherein positioning a thermal grill relative to the item includes positioning the thermal grill adjacent to the item.

3. The method of claim 1 wherein positioning a thermal grill relative to the item includes attaching the thermal grill to the item.

4. The method of claim 1 wherein positioning a thermal grill relative to the item includes covering the item with the thermal grill.

5. The method of claim 1 wherein determining that access to an item needs to be inhibited includes determining how the item may be accessed.

6. The method of claim 1 wherein positioning a thermal grill relative to the item includes orienting the thermal grill such that there is no access to the item unless the individual touches the thermal grill.

7. The method of claim 1 wherein positioning a thermal grill relative to the item includes orienting the thermal grill such that there is only one way to access the item without touching the thermal grill.

8. The method of claim 1 wherein positioning a thermal grill relative to the item includes orienting the thermal grill such that there a plurality of ways to access the item without touching the thermal grill.

9. The method of claim 1 wherein positioning a thermal grill relative to the item includes positioning the thermal grill relative to an area.

10. The method of claim 9 wherein positioning the thermal grill relative to an area includes positioning the thermal grill relative to a room.

11. The method of claim 1 wherein positioning a thermal grill relative to the item includes integrating the thermal grill with the item.

12. The method of claim 11 wherein integrating the thermal grill with the item includes fabricating the item such that the thermal grill is part of the item.

13. The method of claim 12 wherein fabricating the item such that the thermal grill is part of the item includes fabricating a door such that the thermal grill is part of a door that inhibits access to an area.

14. A method of inhibiting access, the method comprising:
    determining that access to an item needs to be inhibited;
    integrating a thermal grill with the item such that the thermal grill provides a barrier against an individual touching the item, the thermal grill having warm portions and cold portions interlaced with the warm portions, the thermal grill providing a barrier when activated by heating the warm portions and cooling the cold portions to create a temperature differential, the temperature differential between the heated warm portions and the cooled cold portions causing pain to the individual without causing physiological damage when the individual touches the thermal grill; and
    activating the thermal grill when the thermal grill is integrated with the item, the thermal grill being activated for an entire duration of time during which access to the item is to be inhibited such that the warm portions are always heated and the cold portions are always cooled during activation of the thermal grill.

15. The method of claim 14 wherein integrating the thermal grill with the item includes attaching the thermal grill to the item.

16. The method of claim 14 wherein integrating the thermal grill with the item includes locating the thermal grill on the item such that there is no way to touch the item unless the individual contacts the thermal grill.

17. The method of claim 14 wherein integrating the thermal grill with the item includes fabricating the item such that the thermal grill is part of the item.

18. The method of claim 17 wherein fabricating the item such that the thermal grill is part of the item includes fabricating a door such that the thermal grill is part of a door that inhibits access to an area.

19. A method of inhibiting access, the method comprising:
    placing a thermal grill in a location that inhibits an individual from engaging an item, the thermal grill having warm portions and cold portions interlaced with the warm portions; and activating the thermal grill in the location to heat the warm portions and cool the cold portions to create a temperature differential, the thermal grill being activated for an entire duration of time during which the individual is to be inhibited from engaging the item such that the warm portions are always heated and the cold portions are always cooled during activation of the thermal grill.

20. The method of claim 19 wherein placing a thermal grill in a location that inhibits an individual from engaging an item includes positioning the thermal grill adjacent to the item.

21. The method of claim 19 wherein placing a thermal grill in a location that inhibits an individual from engaging an item includes orienting the thermal grill such that there is no access to the item unless the individual contacts the thermal grill.

22. The method of claim 19 wherein placing a thermal grill in a location that inhibits an individual from engaging an item includes integrating the thermal grill with the item.

23. The method of claim 22 wherein integrating the thermal grill with the item includes forming the thermal grill as part of the item.

24. The method of claim 19 wherein placing a thermal grill in a location that inhibits an individual from engaging an item includes positioning the thermal grill relative to an area such that the thermal grill inhibits the individual from entering the area.

25. The method of claim 24 wherein positioning the thermal grill relative to an area such that the thermal grill inhibits the individual from entering the area includes positioning the thermal grill relative to a room.

* * * * *